(12) United States Patent
Powdrill et al.

(10) Patent No.: US 12,313,832 B2
(45) Date of Patent: May 27, 2025

(54) THREE-AXIS ACTUATOR FOR A PORTABLE MICROSCOPE

(71) Applicants: Sam Powdrill, Wilmore, KY (US); Sam Pletcher, Indianapolis, IN (US)

(72) Inventors: Sam Powdrill, Wilmore, KY (US); Sam Pletcher, Indianapolis, IN (US)

(*) Notice: Subject to any disclaimer, the term of this patent is extended or adjusted under 35 U.S.C. 154(b) by 614 days.

(21) Appl. No.: 17/567,849

(22) Filed: Jan. 3, 2022

(65) Prior Publication Data

US 2022/0252855 A1 Aug. 11, 2022

Related U.S. Application Data

(60) Provisional application No. 63/146,661, filed on Feb. 7, 2021.

(51) Int. Cl.
| | |
|---|---|
| G02B 21/26 | (2006.01) |
| G02B 21/24 | (2006.01) |
| G05G 1/01 | (2008.04) |

(52) U.S. Cl.
CPC .......... *G02B 21/26* (2013.01); *G02B 21/241* (2013.01); *G05G 1/01* (2013.01)

(58) Field of Classification Search
CPC .. G02B 21/26; G02B 21/241; G02B 21/0008; G05G 1/01; G05G 1/30; G05G 9/047
See application file for complete search history.

(56) References Cited

U.S. PATENT DOCUMENTS

| | | | | |
|---|---|---|---|---|
| 4,814,622 | A * | 3/1989 | Gregory | H02N 2/028 850/2 |
| 5,334,918 | A * | 8/1994 | McMurtry | G05B 19/401 700/161 |
| 5,590,060 | A * | 12/1996 | Granville | G01B 11/002 702/155 |
| 6,532,108 | B1 * | 3/2003 | Pensel | G02B 21/0012 359/384 |
| D623,209 | S * | 9/2010 | Matuschek | D16/130 |
| 2021/0035747 | A1 * | 2/2021 | Jawidzik | A61F 9/00736 |
| 2023/0404699 | A1 * | 12/2023 | Kok | A61B 34/25 |

* cited by examiner

*Primary Examiner* — Collin X Beatty
(74) *Attorney, Agent, or Firm* — Alloy Patent Law; Walker Griffin Weitzel

(57) ABSTRACT

A three-axis actuator for a portable microscope have been provided, which may allow foot control of the three axes for providing efficient and effective movement of the portable microscope for use in various applications such as in surgery in a mobile setting. This includes an XY actuator, a Z actuator, and a foot pedal. The XY actuator attaches to the microscope and stands and moves the microscope in X and Y planes. The foot pedal controls the individual actuators using radio frequency transmission. The Z actuator moves the microscope objective lens in a Z plane for focusing the microscope.

9 Claims, 5 Drawing Sheets

THREE-AXIS ACTUATOR FOR A PORTABLE MICROSCOPE

CROSS-REFERENCE TO RELATED APPLICATIONS

The present application claims priority to and the benefit of U.S. Provisional Patent Application No. 63/146,661, filed on Feb. 7, 2021, the contents of which are incorporated herein by reference in their entirety.

FIELD OF THE INVENTION

The present invention disclosed herein generally relates to actuators. More particularly, the present invention discloses a three-axis actuator for a portable microscope. The disclosed actuator allows foot control of the three axes of movement of the portable microscope for use in various applications such as in surgery in a mobile setting.

BACKGROUND

Robotic assemblies for surgery or microsurgery comprising microscope terminating with surgical instruments are known in the field. Solutions available in the state-of-the-art, require a motion strategy that simultaneously involves movements even for small motions of the microscopic instrument in the operating work-field, which results both in a difficult control of the kinematic accuracy and in a large encumbrance in the operating work-field, that in practice becomes inaccessible to the surgeon. As a matter of fact, the application field of the majority of robotic assemblies for microscopic surgery are dedicated to use in minimally invasive surgery (or MIS), such as laparoscopic or endoscopic surgery. In both such applications, the kinematics of the robotic assembly is aimed to optimize the access of the surgical instruments to the operating field through the surgical ports or orifices, a feat that requires the coordination of a plurality of degrees of freedom of movement. In contrast, surgical, and microsurgical, applications in open surgery require an accurate kinematic control of translational movements, over a workspace limited by the field of view of the operating microscope, without the limiting kinematic constraints represented by the surgical ports or natural orifices, and thus benefit hugely from the surgeon's ability to directly access the operating field. Thus, it becomes important to efficiently control the movement of the microscope within the field of view. Generally, actuators are used to control the movement of the microscope. Microscopes have had 3 axis actuators on them from many years. However, the primary issues with them for a portable microscope is that they are developed for very heavy microscopes. There is no prior art that explicitly discloses easily portable 3 axis actuators for the microscopes. Therefore, the purpose of the present invention is to provide a three-axis actuator for a portable microscope for facilitating an efficient and effective movement of the portable microscope.

SUMMARY

It will be understood that this disclosure is not limited to the apparatus described herein, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

It is an objective of the present invention to provide a three-axis actuator for a portable microscope, which may allow foot control of the three axes for providing efficient and effective movement of the portable microscope for use in various applications such as in surgery in a mobile setting. The 3-axis actuator for portable ophthalmic microscope, especially intended for cataract surgery, though other uses are possible, may solve the problems of portability of the microscope. The three-axis actuator for a portable microscope (also referred to as a microscope actuator) may be adapted to travel via a plane for use in remote areas. The microscope actuator is lightweight and stable and is designed to fit in a case such as Pelican case. In an exemplary embodiment, internal dimensions of the case may include 22 inches by 17 inches by 10 inches, and external dimensions of the case may include 24.6 inches by 19.7 inches by 11.7 inches. Further, a maximum gross weight may be equal to 50 Lbs due to luggage handling constraints. Further, the Pelican case weighs 20 lbs. Therefore, total assembly weight may be less than or equal to 30 Lbs. Other design considerations may include:

a. X-Y actuation
   i. For centering microscope over pupil
   ii. Actuation via foot pedal or joystick
   iii. Located below the microscope to reduce overall height of assembly, thereby increasing assembly rigidity and weight
      1. Prior art suspends microscope below an x-y actuation table
   iv. Currently using 100 mm (~2") travel in x and y
      1. Sufficient for this use
      2. Using double rail
      3. Integrated actuator motor
b. Z actuation
   i. For adjusting focal plane
      1. Focal plane become narrower as magnification is increased
   ii. Actuation via foot pedal with separate up pedal and down pedal
   iii. Z actuation 25 mm
   iv. Actuator is housed within a base
c. Foot pedal
   i. Wireless—communicates via RF frequency
      1. Communications are discrete and not variable. May use 6 channels:
         a. +x, −x, +y, −y, +z, −z
            i. X transmits at 433 MHz
            ii. Y transmits at 315 MHz
         b. Foot pedal joystick can produce motion in 8 directions:
            i. North, NE, E, SE, S, SW, W, NW
   ii. Lightweight and low profile
      1. Prior art foot pedals are large and heavy (~10 Lbs)
      2. Approximately 6 inches by 7 inches, 8 ounces
      3. Low profile with rubber footplates
      4. Does not require pairing like prior art foot pedals due to simplified RF communication
d. Stabilization
   i. Water bladder is used for ballast to stabilize assembly during use
e. Power
   i. 12V or 9V lithium battery powers actuators
   ii. 5V USB power out port on side is used to power Go-Pro camera, if desired

These and other features and advantages of the present invention will become apparent from the detailed description below, in light of the accompanying drawings.

BRIEF DESCRIPTION OF ACCOMPANYING DRAWINGS

The foregoing summary, as well as the following detailed description of the innovation, is better understood when read in conjunction with the appended drawings. For the purpose of illustrating the innovation, exemplary constructions of the innovation are shown in the drawings. However, the innovation is not limited to the specific methods and structures disclosed herein. The description of a method step or a structure referenced by a numeral in a drawing is applicable to the description of that method step or structure shown by that same numeral in any subsequent drawing herein.

Figure 1:
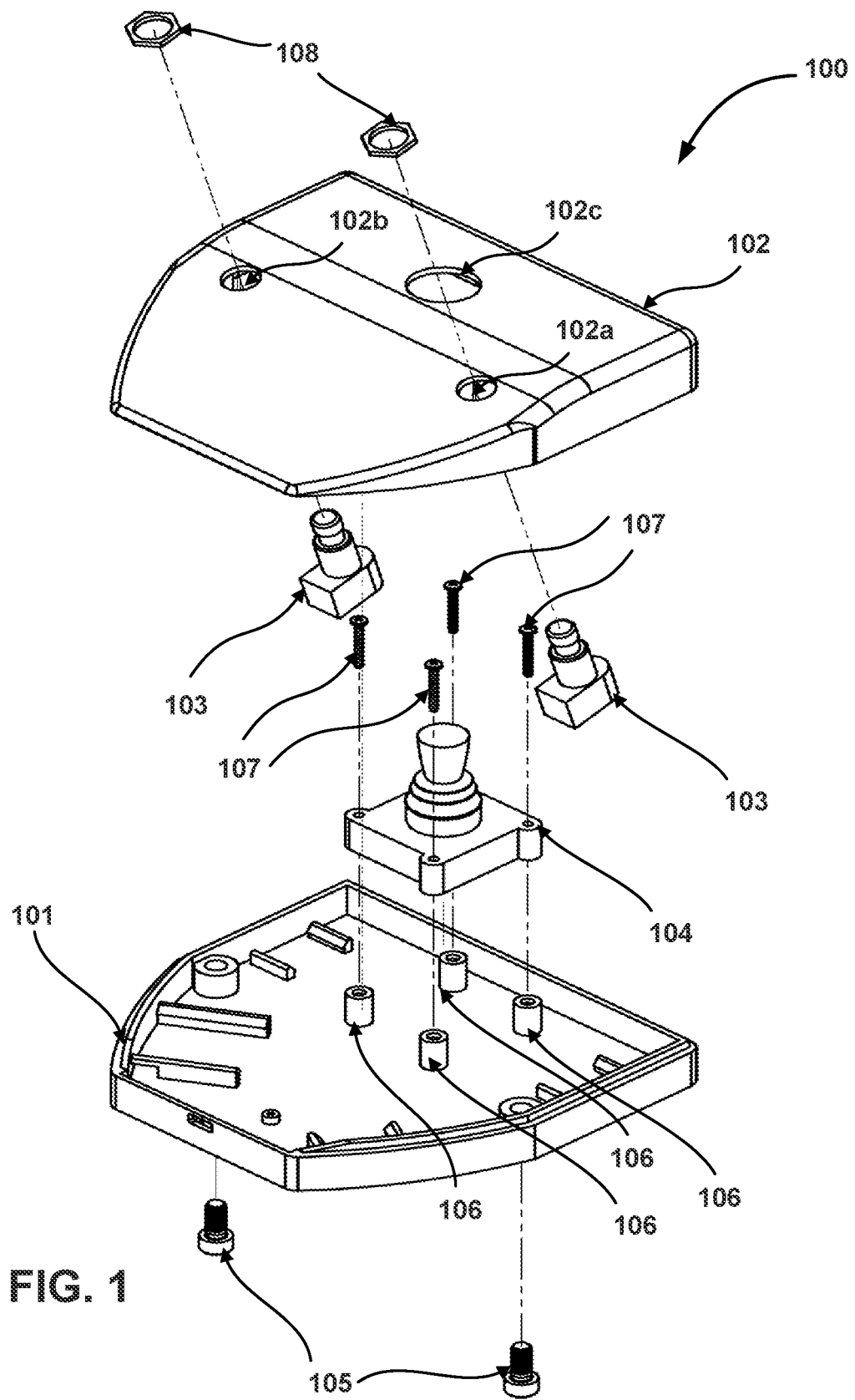
FIG. 1 is a diagram that illustrates a foot pedal in an explored version, according to an exemplary embodiment of the present invention.

Further areas of applicability of the present invention will become apparent from the detailed description provided hereinafter. It should be further understood that the detailed description of exemplary embodiments is intended for illustration purposes only and is, therefore, not intended to necessarily limit the scope of the invention.

DETAILED DESCRIPTION

As used in the specification and claims, the singular forms "a", "an", and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which contribute to a three-axis actuator for a portable microscope. The disclosed apparatus allows foot control of three axis of movement of the portable microscope for use in a surgery in a mobile setting. Accordingly, the components have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed apparatuses have been described below, it should be understood that they have been presented for purposes of example only, and not limitations. It is not exhaustive and does not limit the present invention to the precise form disclosed. Modifications and variations are possible in light of the below teachings or may be acquired from practicing of the present invention, without departing from the breadth or scope.

The three-axis actuator for a portable microscope of the present invention will now be described with reference to the accompanying drawings, which should be regarded as merely illustrative without restricting the scope and ambit of the present invention. Embodiments of the present invention will now be described with reference to FIGS. 1-5 to present a detailed overview of the three-axis actuator. An actuator is a device that produces a motion by converting energy and signals going into the system. The motion it produces can be either rotary or linear. The three-axis actuator produces motion along x-axis, y-axis, and z-axis. The three-axis actuator of the present invention primarily includes an XY actuator (shown in FIG. 2) and a Z actuator (shown in FIG. 3), which can be controlled using a foot pedal (shown in FIGS. 1 and 4). The present invention is meant to be modular in the sense that the XY actuator and the Z actuator may be used independently of each other. When the Z actuator is used by itself, a different simpler foot pedal with up and down control may be utilized. Generally, when the XY actuator is used, the Z actuator would be also (although not necessary) and in this case, the 3-axis foot pedal is used which uses a joystick for XY and 2 buttons to control the up and down of the Z actuator.

Figure 4:
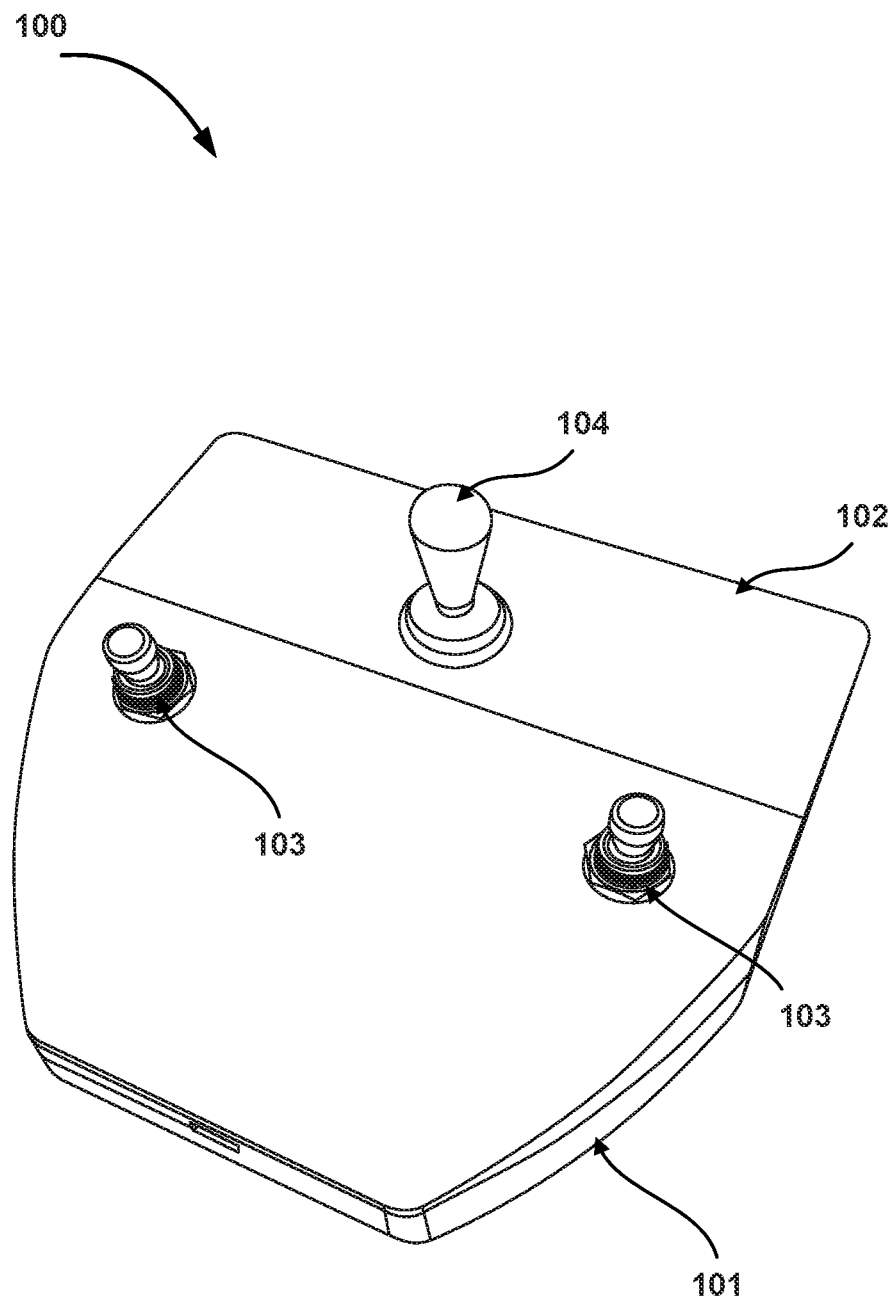
FIG. 4 is a diagram that illustrates an assembled foot pedal, according to an exemplary embodiment of the present invention.

FIG. 1 is a diagram that illustrates a foot pedal 100 in an explored version, according to an exemplary embodiment of the present invention. The foot pedal 100 is configured to control one or more individual actuators using the radio frequency transmission. The foot pedal 100 includes a bottom portion 101 and a top portion 102 that act as enclosure of the foot pedal 100 when attached therebetween (as shown in FIG. 4). The top portion 102 includes three openings 102a, 102b, and 102c. The foot pedal 100 further includes two SPST (Single Pole Single Throw) momentary switches 103 that are configured to pass through two openings 102a and 102b in the top portion 102. The SPST momentary switch 103 is a push button that is used in applications which requires momentary ON or OFF switching action. Normally Open Push button switch are initially in OFF state as the contacts are not in contact with each, and when pushed down, the contacts gets closed and the path established between the two terminals of the push button. The foot pedal 100 further includes a joystick 104 that is configured to pass through the opening 102c in the top portion 102. The joystick 104 is a device consisting of a stick that pivots on a base and reports its angle or direction to the device it is controlling. The joystick 104 may be used to control the movement of one or more portable parts of the microscope. The foot pedal 100 further includes two M6-14 mm socket heads 105. The socket head 105 is a screw that may be used to lock or attach the bottom portion 101 and the top portion 102 of the foot pedal 100 together. The foot pedal 100 further includes four rubber grips 106. The rubber grips 106 may provide gripping facilities to a respective component such as the joystick 104 when it is installed into the bottom portion 101. The foot pedal 100 further includes four M2.5-20 mm Philips heads 107 and two SPST switch nuts 108.

In an embodiment, each SPST momentary switch 103 may be removably attached or connected to the top portion 102 by means of the SPST switch nut 108. Further, the joystick 104 may be removably attached or connected to the rubber grip 106 on the bottom portion 101 by means of the M2.5-20 mm heads 107. The top portion 102 includes a circular hole (i.e., the opening 102c) from which the stick of the joystick 104 may come out and thus is easy operate. Further, the socket head 105 may be used to lock the bottom portion 101 and the top portion 102 of the foot pedal 100.

In an embodiment, for the foot pedal 100, the joystick 104 attaches to 4 radiofrequency transmitters to send signals to the XY actuator 200. The two momentary SPST buttons 103 attaches to the 2 radiofrequency transmitters to send signals to the Z actuator 300. Further, a rechargeable battery may be used to power the transmitters. In an embodiment, the foot pedal 100 may produce motion along 8 directions including North, North-East, East, South-East, South, South-West, West, and North-West.

Figure 2:
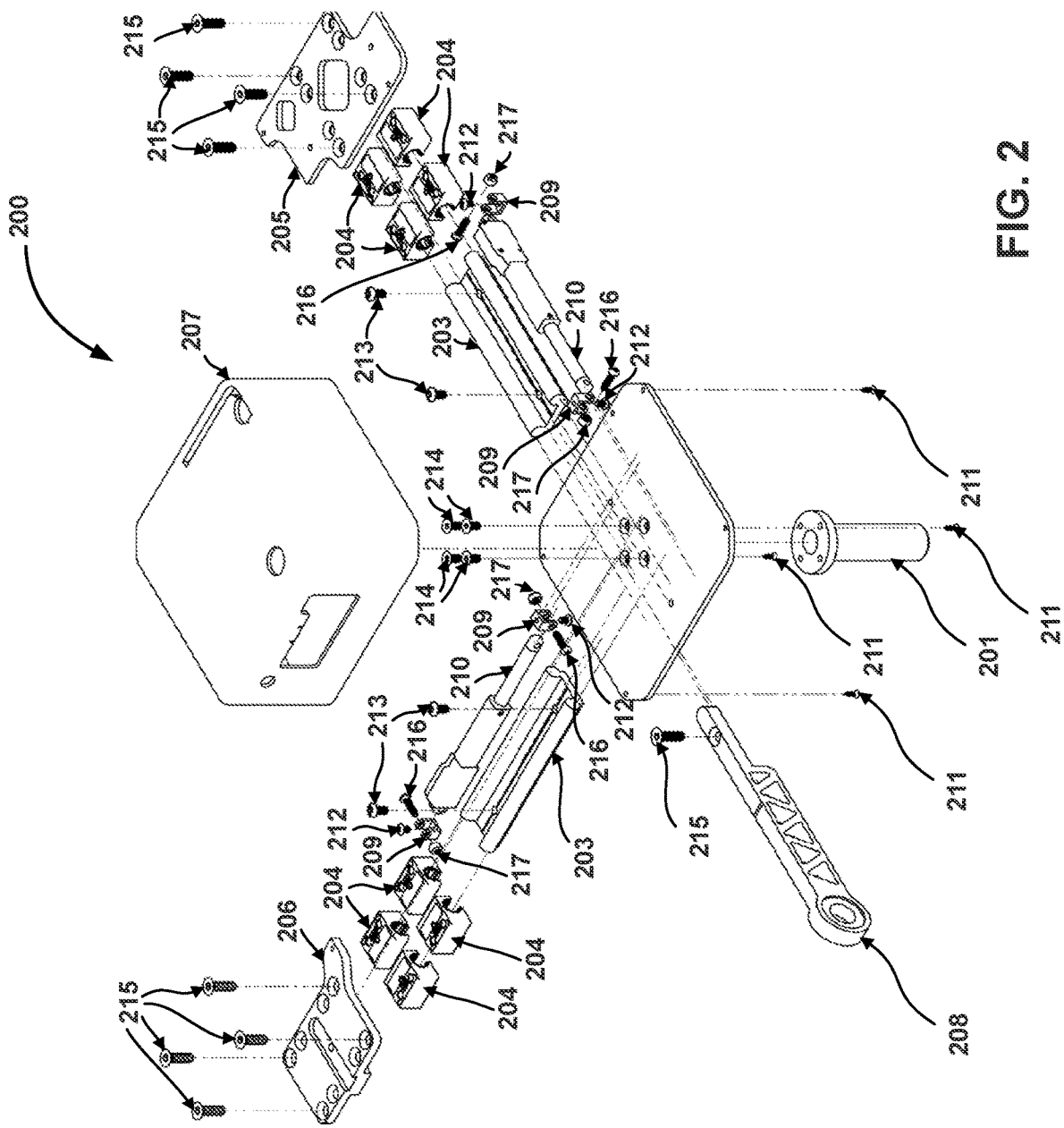
FIG. 2 is a diagram that illustrates an X-Y actuator in an explored version, according to an exemplary embodiment of the present invention.

FIG. 2 is a diagram that illustrates an X-Y actuator 200 in an explored version, according to an exemplary embodiment of the present invention. In an embodiment, the XY actuator 200 attaches to the microscope and stands and moves the microscope in the X and Y planes. The X-Y actuator 200 includes various components such as a top pin mount 201, a bottom plate 202, two linear rails 203, eight pillow blocks 204, a Y-axis plate 205, a top arm mount 206, a cover 207, and an arm 208. The X-Y actuator 200 further includes four actuator brackets 209, two linear actuators 210, four ⅜-inch flat head screws 211, four M4×6 mm button heads 212, four M5×10 mm button heads 213, four M5×10 mm flat heads 214, nine M6×20 mm flat heads 215, four M4×16 mm Philips heads 216, and M4 Nylock nut 217. In an embodiment, the top pin mount 201 is removably attached or connected to the bottom plate 202 from its bottom and is tighten by means of the four heads 214. Further, the cover 207 is used to cover the bottom plate 202 by means of the four head screws 211. Further, each end of the linear actuator 210 is inserted into the respective actuator bracket 209 and is locked by means of the head 216 and the nut 217. Another button head 212 may be inserted through the actuator bracket 209 to tighten the grip. Further, the pillow blocks 204 may be rolled over the linear rail 203. Further, the arm 208 may inserted into the linear rail 203 and is then tighten by the head 215. Another button heads 213 may be used to tighten the liner rail 203.

In an embodiment, the two linear rails 210 with the four pillow block couplers per rail have been provided to handle the torque placed by the microscope and to allow for 2 axis movement. Two linear actuators 210 are provided for 50 mm movement. An arm attached to one level (to arm mount) attaches to the microscope where two directions of movement is translated to the microscope. The base plate (bottom plate 202) and the attached top mount pin 201 attaches to the microscope stand. The individual linear rails 203 are attached to the bottom plate or Y axis plate 202 to allow movement in both directions. Two separate 2 relay receivers receive the signals from the foot pedal to move both linear actuators 210.

Figure 3:
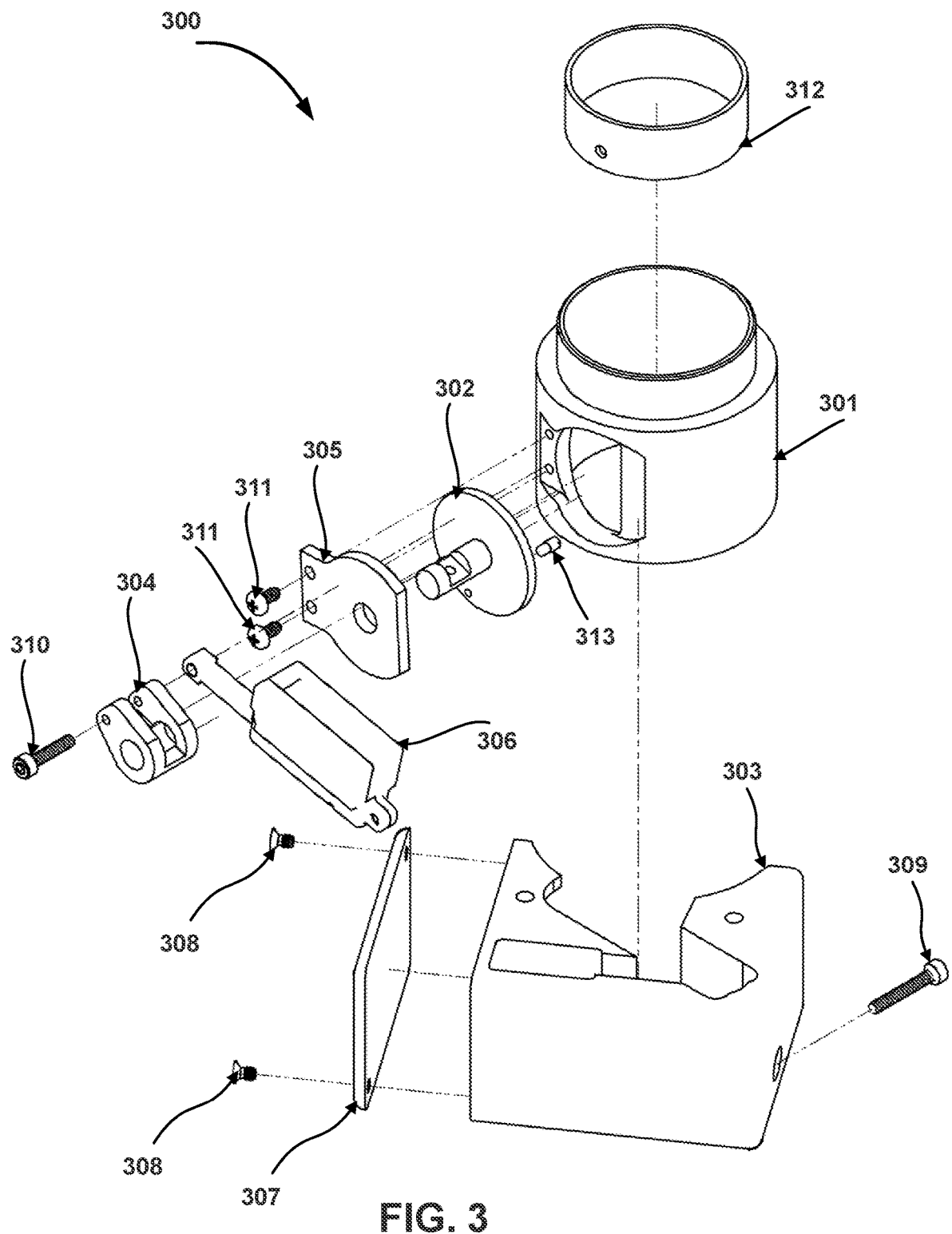
FIG. 3 is a diagram that illustrates a Z actuator in an explored version, according to an exemplary embodiment of the present invention.

FIG. 3 is a diagram that illustrates a Z actuator 300 in an exploded version, according to an exemplary embodiment of the present invention. The Z actuator 300 moves the microscope objective lens in the Z plane for focusing the microscope. The Z actuator 300 may include various components such as a case 301, a pin 302, a main box 303, a camshaft 304, a pin bracket 305, a linear actuator 306, and a side cover 307. The Z actuator 300 may further include two M3-5 mm flat heads 308, a M3-20 mm socket head 309, a M3-14 mm socket head 310, three M3-6 mm machine screws 311, an inner lens 312, and a lens screw 313. In an embodiment, the pin 302 is inserted into the pin bracket 305 through an opening, and then, the arrangement is locked to an outer opening in the case by means of the screws 311. Further, the camshaft 304 and the linear actuator 306 are removably connected to each other by means of the head 310. Further, the inner lens 312 is placed inside the case and is tighten by means of the lens screw 313.

In an embodiment, for the Z actuator 300, the lens case holds an objective lens below the microscope. The metal pin which rotates with a screw for the objective lens may translate linear motion in one direction into a rotation which moves the objective lens up and down. The micro linear actuator attaches to the pin using a cam shaft to translate the linear to rotary motion. The main box is a housing unit which has cut-outs to house and seat the linear actuator and camshaft system. A radio frequency receiver receives a signal from the foot pedal and operates the linear actuator. The materials have been chosen primarily to reduce and optimize weight of the entire system. We have chosen aluminium pillow blocks over less expensive zinc pillow blocks to save weight within the XY actuator linear rails. The invention will not work if we utilize traditional ball bearing slides as the torque of the microscope will bind up the XY movement. In an embodiment, the actuators are powered by a 12-volt or 9-volt lithium battery. The actuators are lightweight and stable and are designed to fit in a case such as Pelican case. Internal dimensions of the case include 22 inches by 17 inches by 10 inches, and external dimensions of the case include 24.6 inches by 19.7 inches by 11.7 inches.

FIG. 4 is a diagram that illustrates an assembled foot pedal 100, according to an exemplary embodiment of the present invention. The foot pedal 100 includes the bottom portion 101 and the top portion 102. The foot pedal 100 further includes two SPST momentary switches 103. The SPST switch 103 is a switch that only has a single input and can connect only to one output. The SPST momentary switch 103 is a push button that is used in applications which requires momentary ON or OFF switching action. Normally Open Push button switch are initially in OFF state as the contacts are not in contact with each and when pushed down the contacts gets closed and the path established between the two terminals of the push button. The foot pedal 100 further includes a joystick 104. The joystick 104 is a device consisting of a stick that pivots on a base and reports its angle or direction to the device it is controlling. The joystick 104 may be used to control the movement of one or more portable parts of the microscope. In an embodiment, for the foot pedal, the joystick 104 attaches to 4 radiofrequency transmitters to send signals to the XY actuator 200. The two momentary SPST buttons 103 attaches to the 2 radiofrequency transmitters to send signals to the Z actuator 300. Further, a rechargeable battery may be used to power the transmitters.

Figure 5:
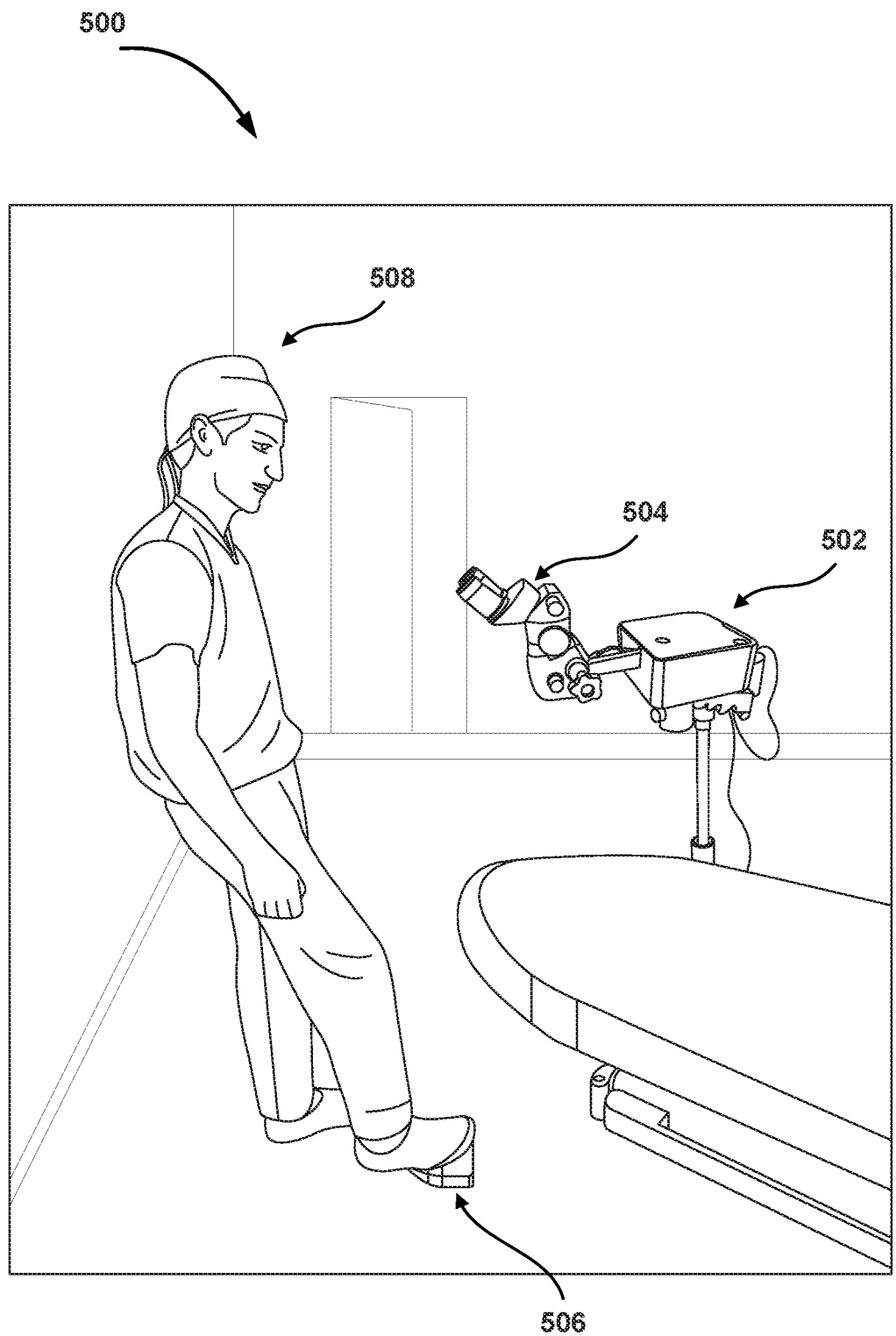
FIG. 5 is a diagram that illustrates a use case scenario of using the three-axis actuator, according to an exemplary embodiment of the present invention.

FIG. 5 is a diagram 500 that illustrates a use case scenario of using the three-axis actuator, according to an exemplary embodiment of the present invention. Here, as shown, a microscope 504 has been attached to the three-axis actuator 502. The three-axis actuator 502 may be configured to produce motion along x-axis, y-axis, and z-axis. For example, the XY actuator 200 (as shown in FIG. 2) may be configured to produce motion along x-axis and y-axis. The Z actuator 300 (as shown in FIG. 3) may be configured to produce motion along z-axis. These motion may be controlled by the foot pedal 506 (also shown by 100 in FIGS. 1 and 4). For example, an individual 508 (such as a doctor) may operate the foot pedal 506 to adjust and control the motion of the three-axis actuator 502 which in turn adjusts and control the motion of the microscope 502 along the three-axis. In an embodiment, the XY actuator attaches to the microscope and stand and moves the microscope in the X and Y planes. The Z actuator moves the microscope objective lens in the Z plane for focusing the microscope. The foot pedal controls the individual actuators using radio frequency transmission.

The disclosed 3-axis actuator differs in at least 3 distinct ways. Firstly, for the Z focus actuator, we have eliminated most of the weight of more traditional systems which raise and lower the microscope head by moving only the objective lens. This allows our invention to use a micro-linear actuator which is extremely light weight. Secondly, for the XY actuator, we believe we have a distinct design since all other XY actuators use a "dropdown" design whereas the microscope is directly underneath the XY actuator. The invention has a distinct design in that the XY actuator is located on the same level as the microscope and the design of our XY actuator had to accommodate sideways torque of the weight of the microscope. Thirdly, we believe we have a distinct difference in how the 3-axis actuator is powered in that we are running the entire 3 axis actuator simply with 9V of power and 1.4 mA of current allowing for our system to be run off of a battery and not need to be plugged into 110V.

The materials have been chosen primarily to reduce and optimize weight of the entire system. We have chosen aluminium pillow blocks over less expensive zinc pillow blocks to save weight within the XY actuator linear rails. Our invention will not work if we utilize traditional ball bearing slides as the torque of the microscope will bind up the XY movement.

Techniques consistent with the disclosure provide, among other features, the microscope actuators including one or more of the foot pedal 100, the XY actuator 200, and the Z actuator 300. While various exemplary embodiments of the disclosed unit have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope. The present invention is meant to be modular in the sense that the XY actuator 200 and the Z actuator 300 may be used independently of each other. When the Z actuator 300 is used by itself, a different simple foot pedal with up and down control may be utilized. Generally, when the XY actuator 200 is used, the Z actuator 300 would also be used (although not necessary) and in this case, the 3-axis foot pedal is used which uses a joystick for XY actuator 200 and 2 buttons to control the up and down of the Z actuator 300.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A three-axis actuator for a portable microscope, comprising:
    an XY actuator,
    a Z actuator, and
    a foot pedal, wherein,
    the XY actuator attaches to the microscope and stand and moves the microscope in X and Y planes,
    the Z actuator moves the microscope objective lens in a Z plane for focusing the microscope, and
    the foot pedal controls the individual actuators using radio frequency transmission,
    wherein the foot pedal is operable by a user's leg, and
    wherein the XY actuator includes components including at least a top pin mount, a bottom plate, two linear rails, eight pillow blocks, a Y-axis plate, a top arm mount, a cover, an arm, four actuator brackets, two linear actuators, four ⅜-inch flat head screws, four M4×6 mm button heads, four M5×10 mm button heads, four M5×10 mm flat heads, nine M6×20 mm flat heads, four M4×16 mm Philips heads, and M4 Nylock nut.

2. The three-axis actuator of claim 1, wherein the foot pedal is configured to produce motion along 8 directions including North, North-East, East, South-East, South, South-West, West, and North-West.

3. The three-axis actuator of claim 1, wherein the actuators are powered by a 12-volt or 9-volt lithium battery.

4. The three-axis actuator of claim 1, wherein the actuators are are designed to fit in a case.

5. The three-axis actuator of claim 4, wherein internal dimensions of the case include 22 inches by 17 inches by 10 inches, and external dimensions of the case include 24.6 inches by 19.7 inches by 11.7 inches.

6. The three-axis actuator of claim 1, wherein the foot pedal includes a bottom portion and a top portion that act as enclosure of the foot pedal when attached therebetween, wherein the top portion includes three openings.

7. The three-axis actuator of claim 6, wherein the foot pedal includes two SPST (Single Pole Single Throw)

momentary switches that are configured to pass through two openings of the three openings in the top portion.

8. The three-axis actuator of claim 6, wherein the foot pedal includes a joystick that is configured to pass through the third opening of the three openings in the top portion.

9. The three-axis actuator of claim 1, wherein the Z actuator includes components including at least a case, a pin, a main box, a camshaft, a pin bracket, a linear actuator, a side cover, two M3-5 mm flat heads, a M3-20 mm socket head, a M3-14 mm socket head, three M3-6 mm machine screws, an inner lens, and a lens screw.

\* \* \* \* \*